(12) United States Patent
Mita et al.

(10) Patent No.: US 6,206,606 B1
(45) Date of Patent: *Mar. 27, 2001

(54) FIXING DEVICE FOR ROD BODY

(75) Inventors: Kazuhiro Mita; Ohmi Arisaka, both of Yokohama (JP)

(73) Assignee: Piolax Inc., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,254

(22) Filed: Jan. 23, 1998

(51) Int. Cl.[7] ........................................ F16L 3/08
(52) U.S. Cl. ..................... 403/320; 411/349; 248/71; 248/74.3
(58) Field of Search ............................. 248/71, 73, 74.3, 248/74.1; 411/48, 46, 41, 349, 549; 403/320, 328, 326

(56) References Cited

U.S. PATENT DOCUMENTS

| | | | |
|---|---|---|---|
| 2,896,889 | * | 7/1959 | Hershberger et al. ................. 248/71 |
| 2,937,834 | * | 5/1960 | Orenick et al. ........................ 248/71 |
| 2,995,328 | * | 8/1961 | Whitted ................................. 248/71 |
| 3,144,695 | * | 8/1964 | Budwig ............................... 248/74.3 |
| 3,272,061 | * | 9/1966 | Seckerson ....................... 411/349 X |
| 3,465,992 | * | 9/1969 | Schuplin .............................. 248/71 |
| 3,758,060 | * | 9/1973 | Schuplin ............................ 248/74.3 |
| 5,211,519 | * | 5/1993 | Saito .................................. 411/48 X |
| 5,669,108 | * | 9/1997 | Ferrari et al. .................... 411/439 X |
| 5,718,549 | * | 2/1998 | Noda et al. ...................... 411/349 X |

FOREIGN PATENT DOCUMENTS

| | | |
|---|---|---|
| 60-16078 | 12/1982 | (JP) . |
| 57-190904 | 2/1985 | (JP) . |

* cited by examiner

*Primary Examiner*—B. Dayoan
*Assistant Examiner*—David E. Bochna
(74) *Attorney, Agent, or Firm*—Ladas & Parry

(57) ABSTRACT

A fixing device for rod body has a base body with a through hole formed in the center thereof, a grommet body arranged to be inserted into the through hole of the base body, and a pin body arranged to be pushed into an inner hole of the grommet body to expand the grommet body. The grommet body is interlinked with one side edge of the base body through a holder portion for holding the rod body, the pin body is interlinked with another side edge of the base body through a hinge portion, and a temporary fixing device is provided between the grommet body and the through hole of the base body. When the rod body is held by the holder portion and the grommet body is inserted into the through hole of the base body, the grommet body is temporarily fixed to the base body by the temporary fixing device. When the pin body is pushed into the inner hole of the grommet body with the grommet body being inserted in a mounting hole of an objective member, the base body is regularly fixed to the objective member by expansion of the grommet body.

25 Claims, 7 Drawing Sheets

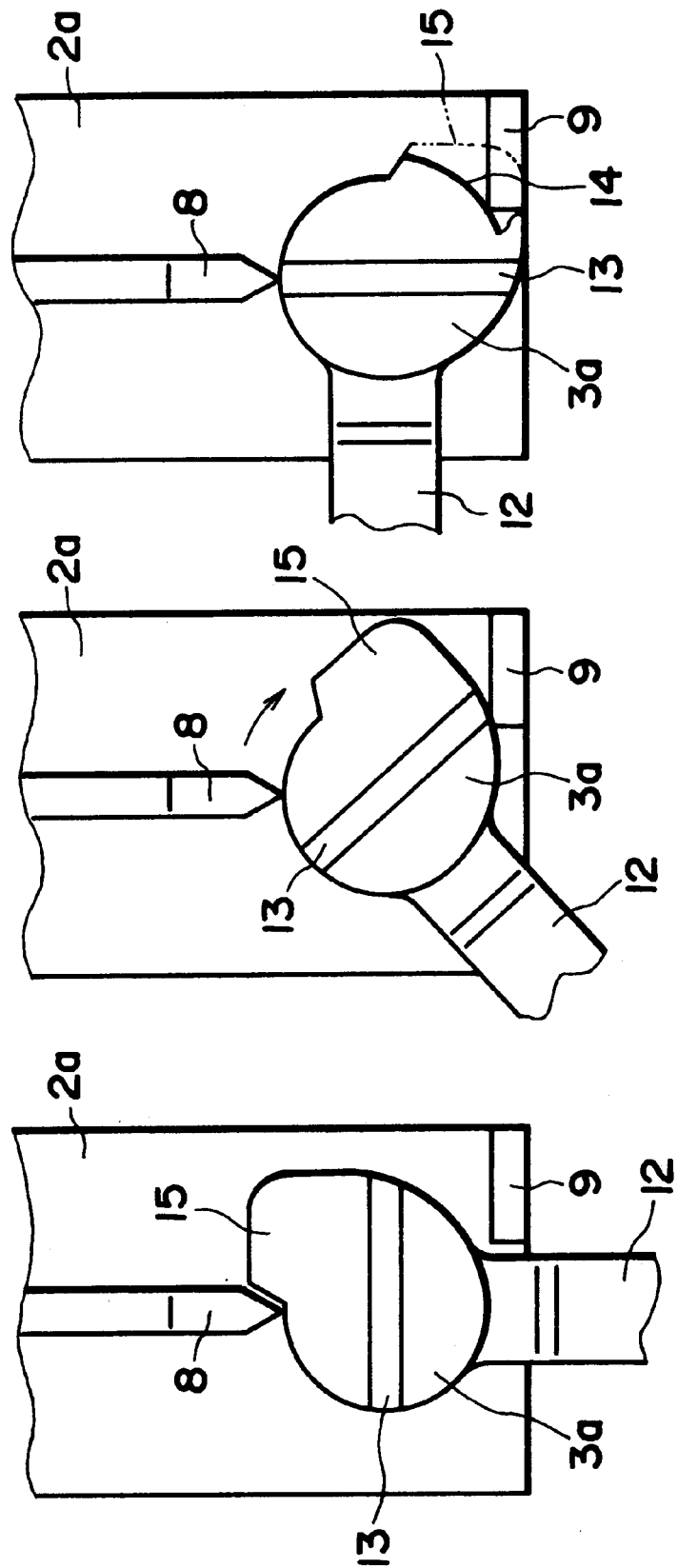

FIXING DEVICE FOR ROD BODY

BACKGROUND OF THE INVENTION

1. Field of the Invention

The present invention relates to improvements in a fixing device for fixing a rod body such as a pipe or a tube to an objective member such as a panel.

2. Related Background Art

An example of the fixing device of this type is the one as shown in Japanese Laid-open Utility Model Applications No. 57-190904 and No. 60-16078.

The conventional fixing device has a main body formed in an annular shape capable of holding a rod body inside and separated at the both ends, and flanges extending from the both ends of the main body and having a through hole. In practical use, the rod body is retained inside the main body and, while keeping the two flanges superimposed, the tip of a bolt is inserted through the through holes of each flange into a through hole of a panel being an objective member. Then a nut is coupled with the tip of the bolt on the back surface side of the panel, whereby the rod body can be fixed to the panel.

Accordingly, the conventional fixing device had an advantage that the rod body was able to be firmly fixed to the panel because of the use of bolt and nut, whereas it also had big problems that the number of parts was naturally increased and, particularly, that the fixing work of the rod body to the panel required great effort.

SUMMARY OF THE INVENTION

An object of the present invention is to provide a fixing device that can firmly fix a rod body to a panel, that involves a small number of parts, and that facilitates the fixing work of the rod body to the panel.

A fixing device for rod body according to the present invention is a fixing device for fixing a rod body to an objective member, comprising a base body with a through hole formed in the center thereof, a grommet body arranged to be inserted into the through hole of the base body, and a pin body arranged to be pushed into an inner hole of the grommet body to expand the grommet body, said grommet body being interlinked with one side edge of the base body through a holder portion for holding the rod body, said pin body being interlinked with another side edge of the base body through a hinge portion, and temporary fixing means being provided between said grommet body and said through hole of the base body, wherein when the grommet body is inserted into the through hole of the base body with the rod body being held by the holder portion, the grommet body is temporarily fixed to the base body by said temporary fixing means and wherein when said grommet body is inserted into a mounting hole of the objective member and said pin body is pushed into the inner hole of the grommet body, the base body is regularly fixed to the objective member by expansion of the grommet body.

In an embodiment of the fixing device for rod body according to the present invention, said pin body has a shank for expanding the grommet body when being pushed in a first posture into the inner hole of the grommet body and for releasing expansion of the grommet body when being changed from the first posture into a second posture in the inner hole of the grommet body and wherein said hinge portion, in a free state thereof, supports the pin body in said first posture.

In an embodiment of the fixing device for rod body according to the present invention, a lock wall is provided on an outer surface of the flange portion of the grommet body and a swelling wall is provided on a side face of a head of the pin body, and wherein when the pin body is pushed in the first posture into the inner hole of the grommet body, said swelling wall comes to engage the lock wall, thereby defining a direction of change of the pin body from the first posture to the second posture in the inner hole of the grommet body.

In an embodiment of the fixing device for rod body according to the present invention, said holder portion and hinge portion extend in directions away from each other from the base body and thereafter curve in a direction opposite to a surface of the base body intended to contact the objective member, whereby the grommet body and the pin body are supported opposite to each other at respective curving tip portions of said portions.

In an embodiment of the fixing device for rod body according to the present invention, the tip of the grommet body is closer to the through hole of the base body than the tip of the pin body.

In an embodiment of the fixing device for rod body according to the present invention, said hinge portion is more elongate than the holder portion.

In an embodiment of the fixing device for rod body according to the present invention, the pin body, the hinge portion, the base body, the holder portion, and the grommet body are positioned on a straight line, the through hole of the base body is open on one edge side of the base body perpendicular to a direction of said straight line, and a projecting portion arranged to contact side faces of the grommet body is provided at edges of the through hole except for the opening side.

In an embodiment of the fixing device for rod body according to the present invention, the base body surrounds the entire periphery of the through hole.

As described above, the present invention permits the rod body to surely be fixed to the objective member in such a manner that the grommet body is temporarily fixed to the base body to achieve the temporary holding state of the rod body to the holder portion, thereafter the grommet body is inserted into the mounting hole of the objective member, and the pin body is inserted into the inner hole of the grommet body, thereby regularly fixing the fixing device to the objective member, and thus the workability is drastically improved as against the conventional fixing devices.

In addition, in an embodiment according to the present invention, the grommet body can be expanded by simply pushing the pin body in its first posture into the inner hole of the grommet body by blind work, and the workability is thus improved furthermore.

In an embodiment according to the present invention, the pin body can be regulated to change in the direction from the first posture to the second posture, whereby the expansion of the grommet body can be prevented from erroneously and readily being released.

In an embodiment according to the present invention, the rod body will be prevented from readily slipping off from the fixing device, even if the expanding state of the grommet body is released.

In an embodiment according to the present invention, the orderly work is very easy.

In an embodiment according to the present invention, the changing work of the pin body from the first posture to the second posture is easy.

In an embodiment according to the present invention, the fixing device itself can be molded by the simple, upper and lower split mold structure, and slipping-off of the pin body from the grommet body can be prevented by the contact action of the projecting portion with the grommet body, even if unexpected external force is exerted on the holder portion.

In an embodiment according to the present invention, the rigidity of the through hole of the base body is enhanced, thereby assuring the sure, temporary fixing state of the grommet body.

BRIEF DESCRIPTION OF THE DRAWINGS

FIGS. 9A, 9B, and 9C are perspective views to show work steps for releasing expansion of the grommet body by rotating the pin body.

DETAILED DESCRIPTION OF THE PREFERRED EMBODIMENTS

Figure 1:
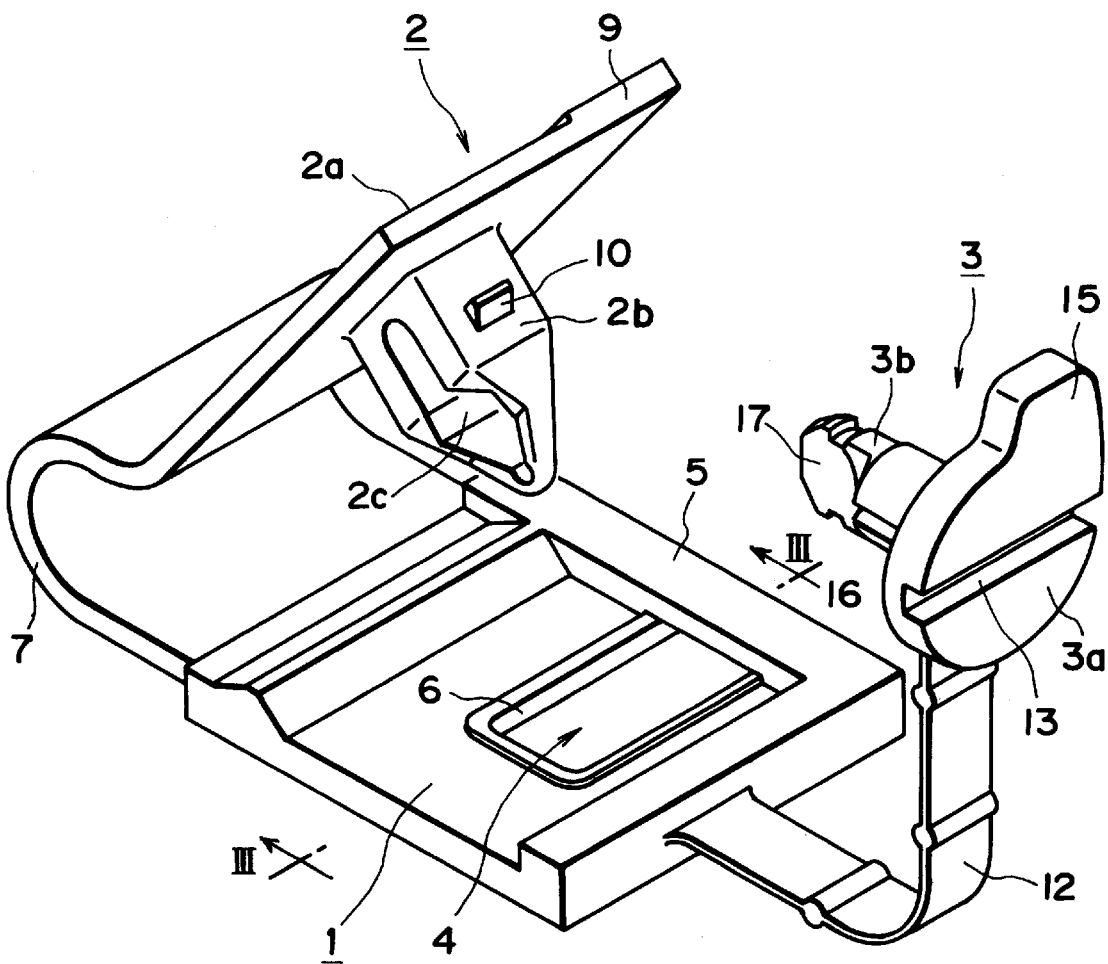
FIG. 1 is a perspective view to show a fixing device according to an embodiment of the present invention.
Figure 2:
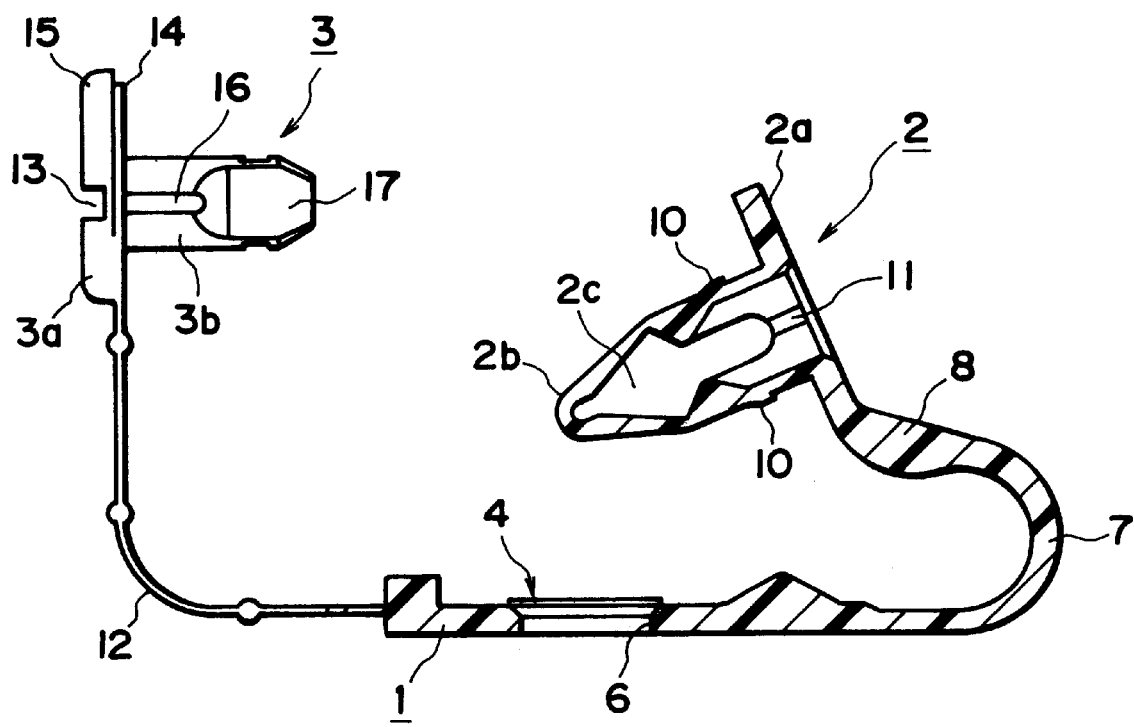
FIG. 2 is a front elevation of the fixing device, partly broken.

The present invention will be described in detail based on the preferred embodiment illustrated. The fixing device of the embodiment is an integrally molded product of synthetic resin, which is constructed in the basic structure, as shown in FIG. 1 and FIG. 2, with a rectangular base body 1 having a through hole 4 formed in the center, a grommet body 2 to be inserted into the through hole 4 of the base body 1, and a pin body 3 to be pushed into an inner hole 2c of the grommet body 2 so as to expand the grommet body 2.

Figure 3:
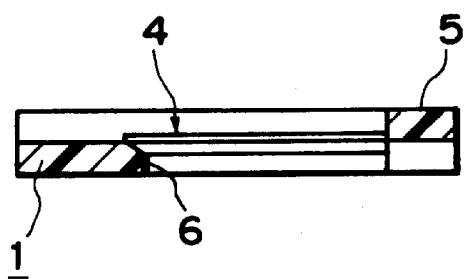
FIG. 3 is an end view taken along line III—III of the fixing device of FIG. 1.

The base body 1 is formed in such a configuration that the through hole 4 is formed in a rectangular hole shape opening on one edge side, that a linking wall 5 links the upper edges defining the opening portion of the rectangular hole shape with each other as also shown in FIG. 3, that the entire periphery of the through hole 4 is surrounded by walls including the linking wall 5, whereby the rigidity of the through hole 4 itself is assured while permitting parting of mold, and that a projecting portion 6 to contact side faces of the grommet body 2 is provided at the edges of the through hole 4 except for the above opening portion.

Figure 4A:
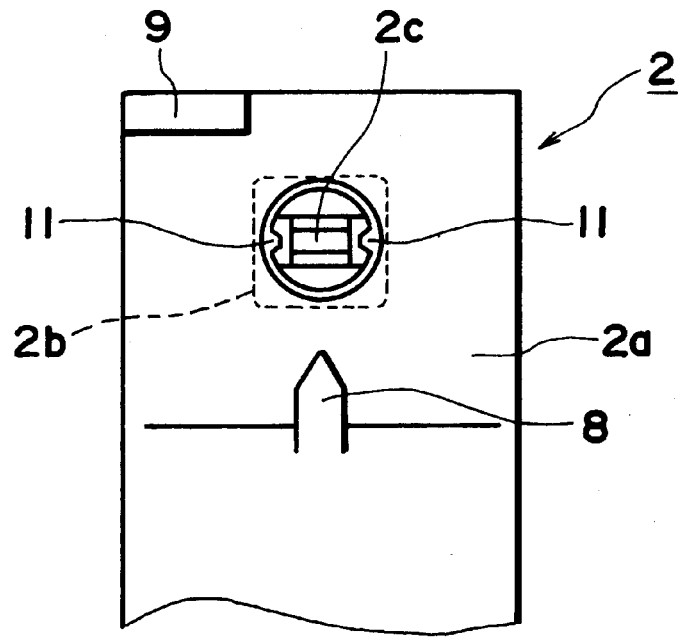
FIGS. 4A and 4B are a plan view of major part and a side view of major part to show the structure of the grommet body part.
Figure 4B:
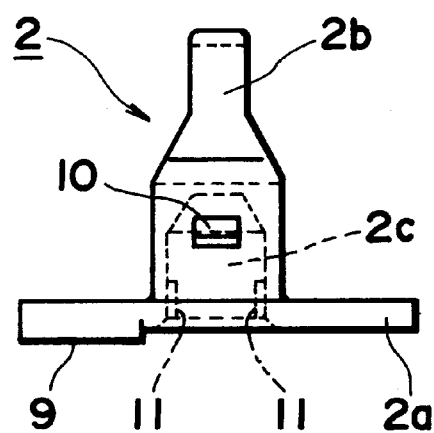

The grommet body 2 is integrally and continuously provided from one side edge of the base body 1 through a lying U-shaped holder portion 7 for holding the rod body. As also shown in FIGS. 4A and 4B, the grommet body 2 is composed of a rectangular flange portion 2a and a barrel portion 2b of a closed ring section. The flange portion 2a is formed continuously from and thus interlinked with the holder portion 7, and a lock wall 8 projects from an external surface of the interlinking region between the flange portion 2a and the holder portion 7. A stopper wall 9 to engage a swelling wall described hereinafter projects near one side of the fore edge of the external surface of the flange portion 2a. In addition, a pair of claws 10 for temporary fixation are formed on opposite outer faces of the barrel portion 2b, and a pair of guide ribs 11 are formed in opposite inner faces of the barrel portion 2b. The holder portion 7 and the flange portion 2a are formed in the width nearly equal to the width of the base body 1.

Figure 5A:
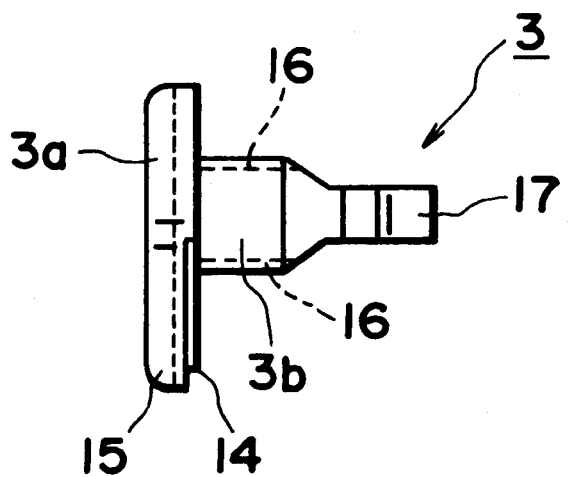
FIGS. 5A and 5B are a plan view of major part and a side view of major part to show the structure of the pin body part.
Figure 5B:
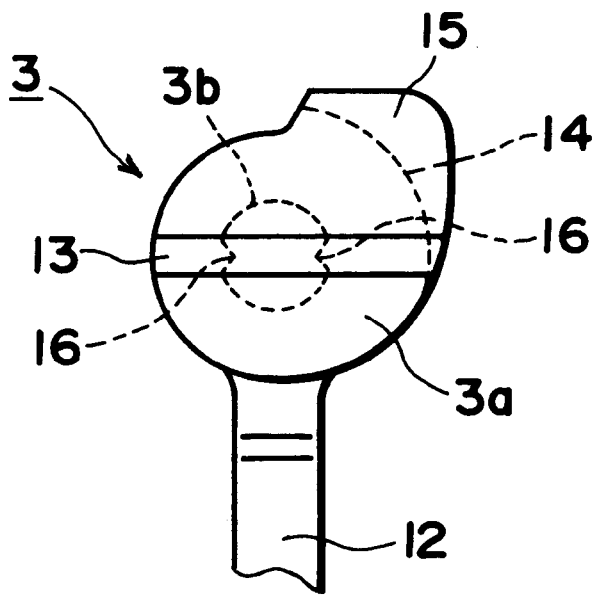

The pin body 3 is continuously formed from and interlinked with the other side edge of the base body 1 through a hinge portion 12 more elongate than the holder portion 7. As also shown in FIGS. 5A and 5B, the pin body 3 is composed of an enlarged head 3a of a disk shape and a shank 3b of a wedge shape, and the enlarged head 3a is interlinked with the hinge portion 12. On the head 3a side, a slot 13 for receiving the tip of a tool such as a screwdriver is formed on the top surface of the head 3a and a swelling wall 14 projects in an eccentric arc shape on the side surface opposite to the hinge portion 12. A tongue 15 continuously extends outwardly from the swelling wall 14.

In the shank 3b, a pair of fitting slots 16 for the guide ribs 11 of the grommet body 2 to be fitted therein are formed on the base end side of the shank and the tip side is positively provided with a chamfered oblong shape. When the oblong tip 17 of the shank 3b is pushed into the inner hole 2c of the grommet body 2 while being kept in a first posture where the shank is naturally interlinked with the hinge 12, the tip 17 automatically expands the grommet body 2. Conversely, when the tip 17 is in a second posture where the shank is forced to rotate 90° in the inner hole 2c of the grommet body 2, the expansion of the grommet body 2 can be released instantly.

In the present embodiment, from the positional aspect, the pin body 3, the hinge portion 12, the base body 1, the holder portion 7, and the grommet body 2 are continuously positioned on a straight line, so that the fixing device can be molded by a simple, upper and lower split mold structure.

Further, the holder portion 7 and hinge portion 12, as illustrated, extend away from each other from the respective side edges of the base body 1 and thereafter curve in the opposite direction to the surface of the base body 1 intended to contact the objective member. The flange portion 2a of the grommet body 2 and the head 3a of the pin body 3 are interlinked each with the tip portion of the holder portion 7 and the hinge portion 12, so that the grommet body 2 and the pin body 3 are supported so as to face each other. In this case, taking account of workability, particularly, the tip of the grommet body 2 is supported closer to the through hole 4 of the base body 1 than the tip of the pin body 3.

Figure 6:
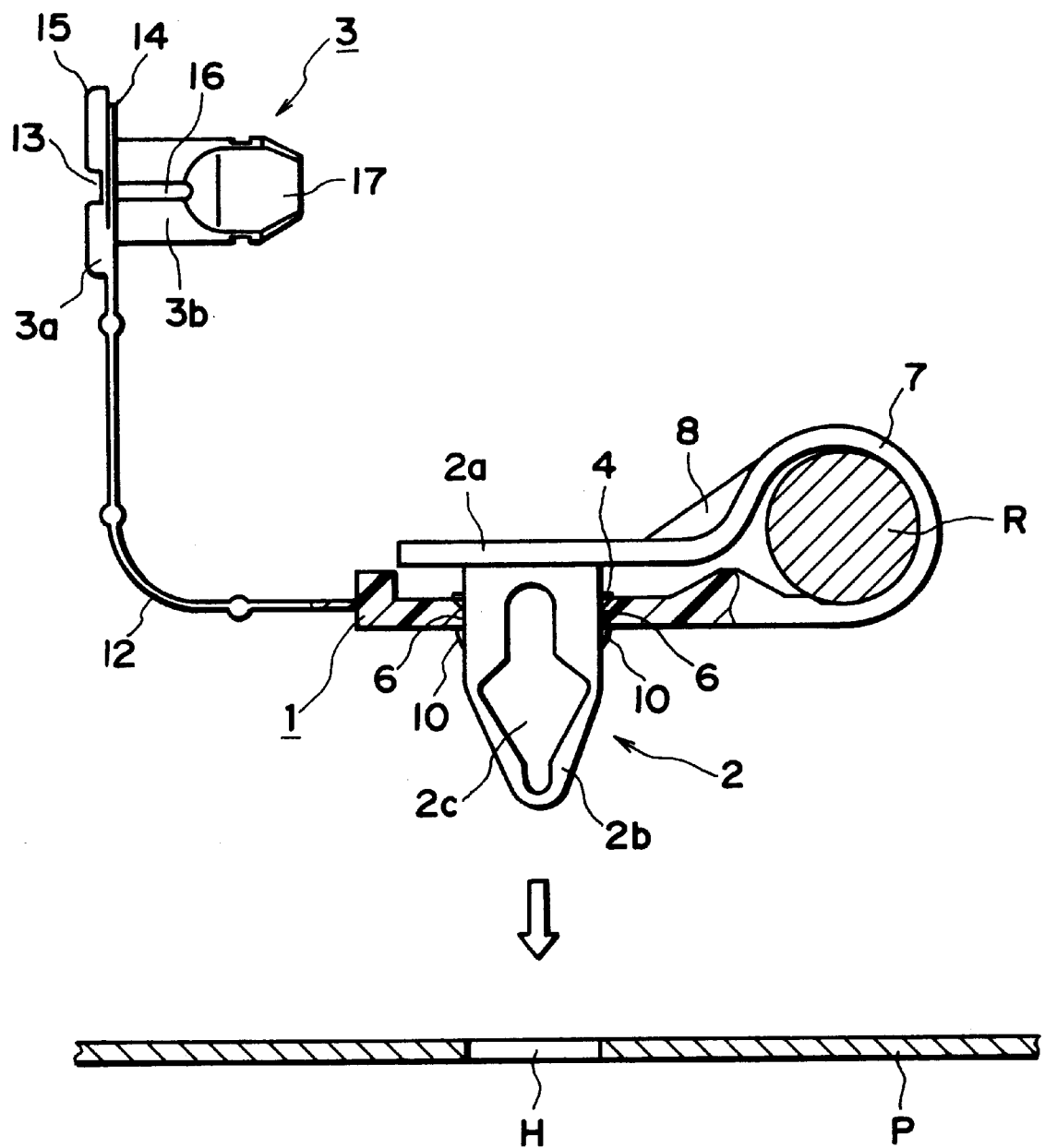
FIG. 6 is a front elevation, partly broken, to show a state in which a rod body is temporarily held in the fixing device.

Using the fixing device of the above structure, a rod body R such as a pipe or a tube is fixed to a panel P of objective member in the following manner. First, the rod body R is held inside the holder portion 7 of the lying U-shape and, with deflecting the holder portion 7, the barrel portion 2b of the grommet body 2 is inserted into the through hole 4 of the base body 1, whereupon the pair of claws 10 for temporary fixation formed in the barrel portion 2b of the grommet body 2 come to engage the lower edges of the projecting portion 6 of the through hole 4, as shown in FIG. 6. This permits the grommet body 2 to be temporarily fixed to the base body 1 and also permits the rod body R to be temporarily held on the fixing device side.

Figure 7:
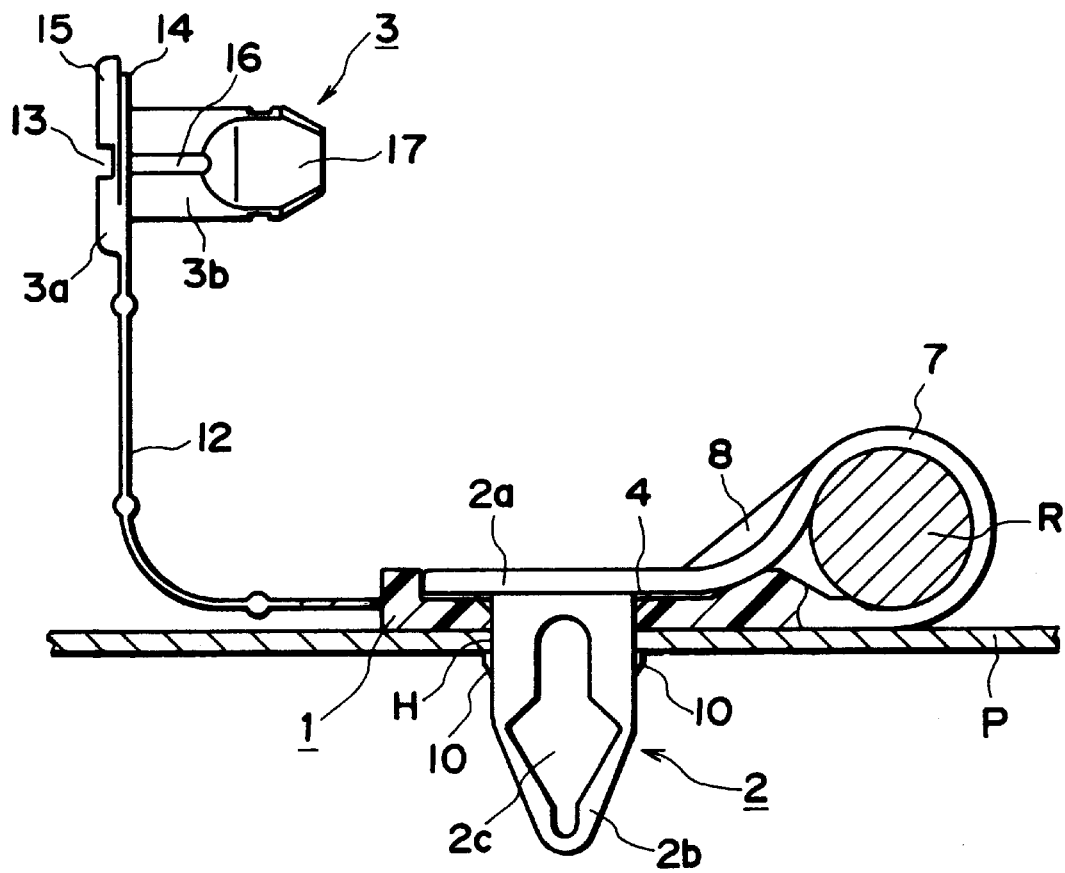
FIG. 7 is a front elevation, partly broken, to show a state in which the fixing device is temporarily fixed to a panel.
Figure 8:
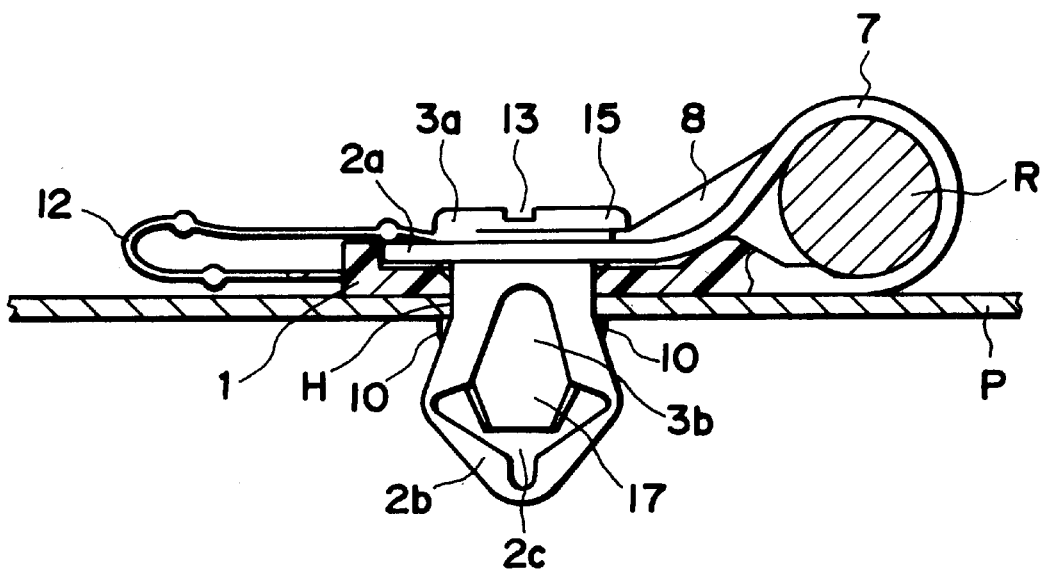
FIG. 8 is a front elevation of major part, partly broken, to show a state in which the fixing device is regularly fixed to the panel whereby the rod body is finally fixed to the panel.

Then the barrel portion 2a of the grommet body 2 is inserted in the above-stated state into a mounting hole H preliminarily formed in the panel P. This time, the pair of temporary fixation claws 10 formed in the barrel portion 2b of the grommet body 2 come to engage the lower edges of the mounting hole H as shown in FIG. 7, whereby the fixing device itself, holding the rod body R, can be temporarily fixed to the panel P. Finally, with guide of the guide ribs 11 and fitting slots 16, the shank 3b of the pin body 3 is pushed into the inner hole 2c of the grommet body 2 while being kept in the first posture described above, whereupon the both sides of the grommet body 2 expand outwardly so as to firmly engage the edges of the mounting hole H of the panel P as shown in FIG. 8. This causes the fixing device itself to be regularly fixed to the panel P and also causes the rod body R to be surely fixed to the panel P. In addition, upon this pushing of the pin body 3, the pin body 3, in its free state, is preliminarily supported in the first posture by the hinge portion 12, which is advantageous in that the pushing can be conducted by a blind work without visually confirming the pushing posture.

In the state wherein the shank 3b of the pin body 3 is pushed into the inner hole 2c of the grommet body 2 to expand the grommet body 2, the lock wall 8 on the flange portion 2a side of the grommet body 2 is engaged with the swelling wall 14 on the head 3a side of the pin body 3, as shown in FIG. 9A, which can prevent an erroneous assembling work and which permits the head 3a of the pin body 3 to rotate clockwise in the drawing but prevents the head 3a from rotating counterclockwise. At this time the projecting portion 6 of the through hole 4 is in contact with the side faces of the grommet body 2, which can also reinforce the regular fixing state of the fixing device and restrain slipping-off of the pin body 3.

To the contrary, on an occasion wherein the rod body R fixed to the panel P needs to be dismounted, with deformation of the elongate hinge portion 12, the head 3a of the pin body 3 is gradually rotated in the clockwise direction in which rotation of the head is permitted, i.e., into the second posture by the tip of a tool (not illustrated) put in the slot 13 as shown in FIG. 9B. During the rotation the tongue 15 smoothly passes above the stopper wall 9 of the flange portion 2a; but, when the pin body 3 is rotated 90°, the swelling wall 14 comes to contact the stopper wall 9, as shown in FIG. 9C, so as to impede further rotation thereafter.

By the 90° rotation of the pin body 3, the oblong tip 17 of the shank 3b of the pin body 3 is completely apart from the expanded side faces of the grommet body 2 this time, thus immediately releasing the expansion of the grommet body 2. Therefore, the side wall of the grommet body 2 is deflected back inward, and the rod body R can be readily dismounted from the panel P by pulling the grommet body 2 together with the pin body 3 from the mounting hole H of the panel P. Further, when the rod body R needs to be removed from the fixing device, the shank 3b of the pin body 3 is pulled out of the inner hole 2c of the grommet body 2, whereby the rod body R can be taken out of the holder portion 7. By the arrangement wherein the pin body 3 is regulated to change in the direction from the first posture to the second posture, the expansion of the grommet body 2 can be prevented from erroneously and readily being released.

For again fixing this rod body R to the panel P, the same work as described above will do. Alternatively, the rod body R can also be again fixed to the panel P by inserting the grommet body 2 into the mounting hole H with the pin body 3 being kept in the second posture therein and then rotating the pin body 3 90° to force the pin body 3 back into the initial first posture.

As described above, the present invention employs the above structure to permit the rod body to be surely fixed to the objective member in such a manner that the grommet body is temporarily fixed to the base body to obtain the temporary holding state of the rod body in the holder portion, thereafter the grommet body is inserted into the mounting hole of the objective member, and the pin body is pushed into the inner hole of the grommet body, thereby regularly fixing the fixing device to the objective member, and, therefore, the workability is drastically improved as against the conventional fixing devices.

In addition, in an embodiment according to the present invention, the grommet body can be expanded by simply pushing the pin body in its first posture into the inner hole of the grommet body by blind work, and the workability is thus improved furthermore.

In an embodiment according to the present invention, the pin body can be regulated to change in the direction from the first posture to the second posture, whereby the expansion of the grommet body can be prevented from erroneously and readily being released.

In an embodiment according to the present invention, the rod body will be prevented from readily slipping off from the fixing device, even if the expanding state of the grommet body is released.

In an embodiment according to the present invention, the orderly work is very easy.

In an embodiment according to the present invention, the changing work of the pin body from the first posture to the second posture is easy.

In an embodiment according to the present invention, the fixing device itself can be molded by the simple, upper and lower split mold structure, and slipping-off of the pin body from the grommet body can be prevented by the contact action of the projecting portion with the grommet body, even if unexpected external force is exerted on the holder portion.

In an embodiment according to the present invention, the rigidity of the through hole of the base body is enhanced, thereby assuring the sure, temporary fixing state of the grommet body.

What is claimed is:

1. A fixing device for fixing a rod body to an associated objective member having a mounting hole, said device comprising a base body with a through hole formed in the center thereof, an integral grommet body arranged to be inserted into the through hole of the base body, and an integral pin body arranged to be pushed into an inner hole of the grommet body to expand the grommet body, said grommet body being connected to one side edge of the base body through a flexible holder portion adapted for holding an associated rod body, said pin body being connected to an opposite side edge of the base body through a flexible hinge portion, and temporary fixing means being provided between said grommet body and said base body, so that the grommet body can be inserted into the through hole of the base body to hold a rod body, the grommet body being temporarily fixed to the based body by said temporary fixing means so that said grommet body can be inserted into said mounting hole of an associated objective member, and said pin body then can be pushed into the inner hole of the grommet body, to regularly fix a rod body to the base body by expansion of the grommet body, said grommet body, holder portion, base body, hinge portion and pin body being initially positioned to define a longitudinal plane of the fixing device, with said grommet body and pin body having cooperative portions extending in the same lateral direction away from said longitudinal plane.

2. A fixing device for rod body according to claim 1, wherein said pin body has a shank for expanding the grommet body when being pushed in a first posture into the inner hole of the grommet body and for releasing expansion of the grommet body when being changed from the first posture into a second posture in the inner hole of the grommet body and wherein said hinge portion, in a free state thereof, supports the pin body in said first posture.

3. A fixing device for rod body according to claim 2, wherein a lock wall is provided on an outer surface of the flange portion of the grommet body and a swelling wall is provided on a side face of a head of the pin body, and wherein when the pin body is pushed in the first posture into the inner hole of the grommet body, said swelling wall comes to engage the lock wall, thereby defining a direction of change of the pin body from the first posture to the second posture in the inner hole of the grommet body.

4. A fixing device for rod body according to claim 3, wherein the tip of the grommet body is closer to the through hole of the base body than the tip of the pin body.

5. A fixing device for rod body according to claim 4, wherein said hinge portion is more elongate than the holder portion.

6. A fixing device for rod body according to claim 3, wherein said hinge portion is more elongate than the holder portion.

7. A fixing device for rod body according to claim 3, wherein said holder portion and hinge portion extend in directions away from each other from the base body and thereafter curve in a direction opposite to a surface of the base body intended to contact the objective member, whereby the grommet body and the pin body are supported opposite to each other at respective curving tip portions of said portions.

8. A fixing device for rod body according to claim 7, wherein the tip of the grommet body is closer to the through hole of the base body than the tip of the pin body.

9. A fixing device for rod body according to claim 8, wherein said hinge portion is more elongate than the holder portion.

10. A fixing device for rod body according to claim 7, wherein said hinge portion is more elongate than the holder portion.

11. A fixing device for rod body according to claim 2, wherein the tip of the grommet body is closer to the through hole of the base body than the tip of the pin body.

12. A fixing device for rod body according to claim 11, wherein said hinge portion is more elongate than the holder portion.

13. A fixing device for rod body according to claim 2, wherein said hinge portion is more elongate than the holder portion.

14. A fixing device for rod body according to claim 2, wherein said holder portion and hinge portion extend in directions away from each other from the base body and thereafter curve in a direction opposite to a surface of the base body intended to contact the objective member, whereby the grommet body and the pin body are supported opposite to each other at respective curving tip portions of said portions.

15. A fixing device for rod body according to claim 14, wherein the tip of the grommet body is closer to the through hole of the base body than the tip of the pin body.

16. A fixing device for rod body according to claim 15, wherein said hinge portion is more elongate than the holder portion.

17. A fixing device for rod body according to claim 14, wherein said hinge portion is more elongate than the holder portion.

18. A fixing device for rod body according to claim 1, wherein said holder portion and hinge portion extend in directions away from each other from the base body and thereafter curve in a direction opposite to a surface of the base body intended to contact the objective member, whereby the grommet body and the pin body are supported opposite to each other at respective curving tip portions of said portions.

19. A fixing device for rod body according to claim 4, wherein the tip of the grommet body is closer to the through hole of the base body than the tip of the pin body.

20. A fixing device for rod body according to claim 19, wherein said hinge portion is more elongate than the holder portion.

21. A fixing device for rod body according to claim 4, wherein said hinge portion is more elongate than the holder portion.

22. A fixing device for rod body according to claim 1, wherein the tip of the grommet body is closer to the through hole of the base body than the tip of the pin body.

23. A fixing device for rod body according to claim 22, wherein said hinge portion is more elongate than the holder portion.

24. A fixing device for rod body according to claim 1, wherein the pin body, the hinge portion, the base body, the holder portion, and the grommet body are positioned on a straight line, the through hole of the base body is open on one edge side of the base body perpendicular to a direction of said straight line, and a projecting portion arranged to contact side faces of the grommet body is provided at edges of the through hole except for the opening side.

25. A fixing device for rod body according to claim 24, wherein the base body surrounds the entire periphery of the through hole.

* * * * *